March 4, 1958 V. T. HILLER ET AL 2,825,504

CARPENTER'S SLOPE TAPE

Filed Nov. 30, 1954

Charles L. Martin
Vernon T. Hiller
INVENTORS,

BY Clarence A. O'Brien
and Harvey B. Jacobson
Attorneys

United States Patent Office 2,825,504

Patented Mar. 4, 1958

2,825,504

CARPENTER'S SLOPE TAPE

Vernon T. Hiller, Bakersfield, and Charles L. Martin, West Covina, Calif.

Application November 30, 1954, Serial No. 471,944

1 Claim. (Cl. 235—71)

This invention relates to a novel calculator for utilization by carpenters and other workmen in the construction of roofs and other building structures and facilitates the solving of various construction problems.

The primary object of the present invention resides in the provision of a suitable calculator in the form of a tape or rule which is capable of providing solutions to trigonometric problems as pertain to the length for common or hip roof rafters, the span thereof, or other structural components.

Still further objects and features of this invention reside in the provision of a convenient calculator which is graduated in suitable increments of distance, such as feet and inches, and convenient fractions thereof in order that a carpenter or workman may be supplied with readily applicable information which can be easily used in the measuring of lumber, as necessary.

These, together with the various ancillary objects and features of the invention which will become apparent as the following description proceeds, are attained by this carpenter's slope calculator, preferred embodiments of which have been illustrated in the accompanying drawings, by way of example only, wherein.

Figure 5:
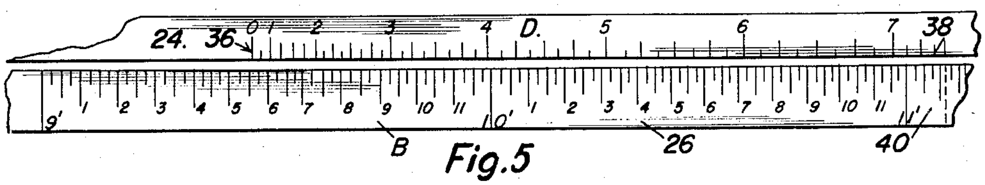
Figure 5 is a partial plan view of portions the tapes illustrating the manner in which a problem can be solved utilizing the invention.
Figures 1, 2, 3, 4:
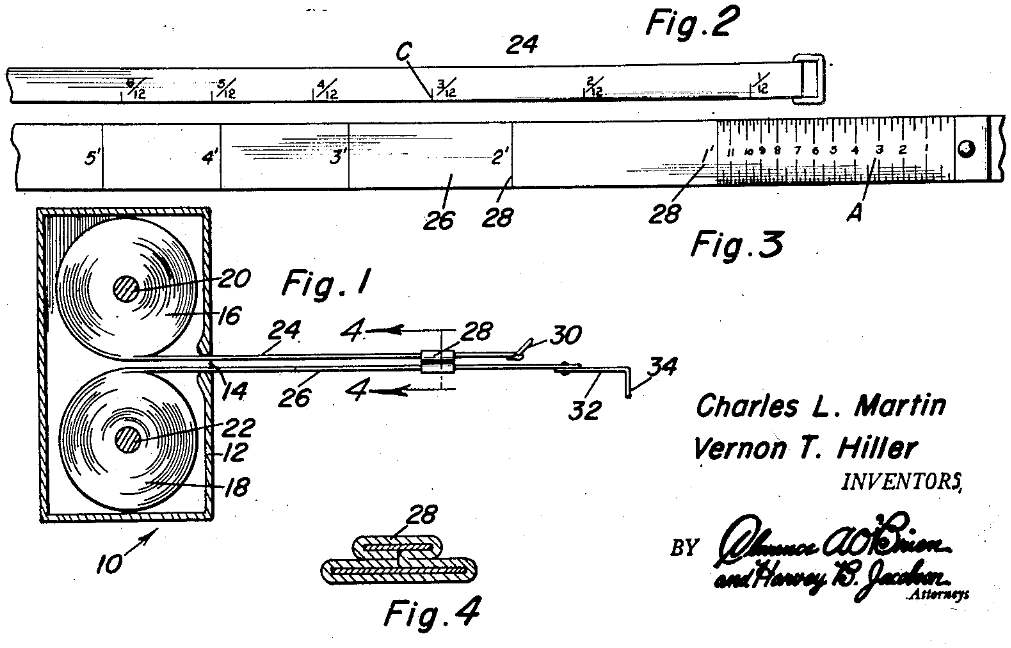
Figure 1 is a sectional view of the invention employing two cooperating tapes.
Figure 2 is a partial plan view of one of the tapes as is shown in Figure 1.
Figure 3 is a partial plan view of the other of the tapes utilized.
Figure 4 is a sectional detail view as taken along the plane of line 4—4 in Figure 1 illustrating the manner in which the tapes therein may be secured for cooperation therebetween.

With continuing reference to the accompanying drawings wherein like reference numerals designate similar parts throughout the various views, reference numeral 10 is used to generally designate one form of carpenter's slope tape employing the concepts of the present invention. This carpenter's slope tape includes a casing 12 having an outlet slot 14 and has drums 16 and 18 mounted in spaced relationship within the casing on suitable shafts 20 and 22. Any suitable means for rotating the rums may be provided, and it is within the concept of the invention to provide springs for automatically rewinding the drums, if such is desired.

Mounted on the drums 16 and 18 are a pair of tapes 24 and 26 which may be adjustably joined together by means of a suitable clamp 28. It is noted that the tape 24 is of less width than the tape 26 and that the clamp slidably holds the tapes 24 and 26 in a selected relationship. An O-member 30 is provided for drawing the tape 24 and the member 30 forms an end stop ring. Further, a separate end piece 32 may be attached to the tape 26 and may be provided with a hole, not shown, for snubbing and may have a bend, as at 34, for use as a snub anchor.

Considering the tapes 26 and 24, it will be noted that the tape 26 is provided with suitable logarithmic indicia, as at 28, thereon, and graduated in, at the portion A, various fractions of an inch and in the other portions, as at B, in feet and preferably fractions thereof. These indicia can be considered as representing for example only such as the span or half-span or a roof. Indicia in the portion of C of the tape 24 may represent rise indicia. Obviously, the tape 24, as is shown in Figure 8, may have a portion D graduated logarithmically to provide common rafter indices.

The invention is utilized to solve various problems. In the portion as is shown in Figure 8, for example, if the corpenter were to know that half of the span distance was 9′ 5¾″, the indices at 36 could be set opposite the indicia at B of tape 26 opposite 9′ 5¾″. Further, if knowledge as to the slope was that the slope was equal to 7⅜ wherein the slope is equivalent to the rise per unit length, this information could be read on scale D of tape 24 at point 38, and the value of the rafter length of 11′ 1½″ could be read directly on the scale B of tape 26. Obviously, various and numerous problems can be solved utilizing the various logarithmic scales provided on the tape.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A carpenter's slope calculator comprising a casing having a pair of winding drums rotatably mounted therein, a first elongated tape being wound in a first direction on a first of said drums and having a logarithmic scale on one face thereof, a second elongated tape being wound in the opposite direction to the first direction on the other of said drums and having at least one complementary logarithmic scale on a face thereof, said casing having a single slot therein, said first and second tapes extending outwardly of said slot, and clamp means for holding said tapes remote from said casing in a selected relationship, said first tape being of substantially less width than the second tape whereby the scale on said second tape is visible when said first tape is superimposed on said second tape.

References Cited in the file of this patent

UNITED STATES PATENTS

| | | |
|---|---|---|
| 1,936,998 | Summers | Nov. 28, 1933 |
| 2,546,243 | Tarshis | Mar. 27, 1951 |

FOREIGN PATENTS

| | | |
|---|---|---|
| 429,777 | Italy | Feb. 3, 1948 |
| 882,616 | France | Mar. 1, 1943 |

OTHER REFERENCES

Pages 23, 26 and 27 of "Special Slide Rules," by J. N. Arnold, comprising Bulletin No. 32 of the Engineering Extension Dept. of Purdue University of Lafayette, Ind., September 1933.